Patented Sept. 25, 1945

2,385,552

UNITED STATES PATENT OFFICE 2,385,552

DEHYDROGENATION OF ALIPHATIC NITRILES

Le Roy U. Spence, Elkins Park, and Fritz O. Haas, Villanova, Pa., assignors to Röhm & Haas Company, Philadelphia, Pa., a corporation of Delaware No Drawing. Application December 5, 1941, Serial No. 421,744

8 Claims. (Cl. 260—464)

This invention relates to a catalytic process for the preparation of unsaturated aliphatic nitriles. It relates to a method of preparing said unsaturated aliphatic nitriles by the catalytic dehydrogenation of the corresponding saturated nitrile. More particularly, it involves the dehydrogenation of aliphatic nitriles at relatively low temperatures by the use of catalysts containing chromium or vanadium. A further object of this invention is to provide an improved process for producing unsaturated nitriles by the use of catalysts containing chromium or vanadium under well-defined conditions.

It is possible to dehydrogenate saturated nitriles to a very limited extent by exposure to temperatures above 600° C. in the absence of catalyst, but the yields are very low. Also this uncatalyzed reaction is accompanied by objectionable side reactions which result in the evolution of hydrogen cyanide and, in some cases, methane. These side reactions occur to an increasing extent if the temperature is raised, as might be done in order to increase the rate of reaction. Lower temperatures favor the dehydrogenation reaction while higher temperatures favor the splitting out of hydrogen cyanide.

These reactions may be illustrated by the following typical equations showing the manner in which isobutyronitrile may decompose under the influence of heat:

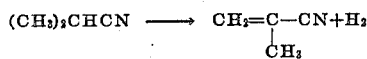
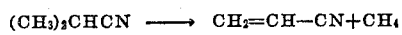

By the employment of catalysts we have found that the yield of unsaturated nitriles can be greatly increased at temperatures which are so low as not to cause appreciable splitting out of the hydrogen cyanide. Our invention results in yields of unsaturated nitriles, from saturated nitriles, which are far in excess of those obtained heretofore.

The dehydrogenation reaction is dependent on the temperature, the choice of catalyst, and the time of contact of the reactants and catalyst. Ordinarily, the saturated nitrile is introduced at one end of a heated reaction zone containing the catalysts and the products are removed from the other end although other methods of carrying on the reaction may be employed. At the upper limit of the temperature range the reactants can be introduced at the highest input rate; and, as the temperature is lowered, the input rate is lowered since the reaction proceeds more slowly at lower temperatures. The ratio of the volumes of reactants and catalyst being a factor, we express the rate of input of reagents by the term "space-velocity" which is defined as "The liters of total vapor, calculated at standard conditions, per liter of catalyst per hour." Higher space-velocity values indicate a higher input rate.

As indicated above, the temperature of reaction is of utmost importance. At low temperatures, the rate of reaction is too slow and at higher temperatures (over 700° C.) the splitting-out of hydrogen cyanide is favored. We operate at temperatures between 550° C. and 650° C., with the preferred range between 600° and 625° C.

The reaction is dependent on the choice of specific catalysts and on the maintenance of proper conditions of operation. It has been proposed to dehydrogenate saturated nitriles by exposing them to temperatures between 400° and 800° C. in the presence of the oxides, sulfides, silicates and other compounds of metals except the few in groups I and VIII of the periodic table. Also silica and shiny graphite have been suggested. It would be expected, therefore, that any of thousands of catalysts might be used for the reaction. We have found that this is not the case and that specific catalysts perform specific functions. In accordance with our invention, catalysts containing only chromium or vanadium produce results of commercial significance. Furthermore, the particular form of the catalyst is of utmost importance. Catalysts which may serve as dehydrogenation catalysts in one reaction may not necessarily serve the same capacity in another reaction. Essentially the same catalyst prepared by different methods may contain, in some cases, impurities which serve as poisons and reduce or destroy the catalytic value of the material.

Our invention involves the use of specific catalysts containing chromium or vanadium of specific origin. They may be prepared by various methods, a few of which are particularly desirable and noteworthy. Such methods are those which produce hydrated chromium oxide in a gelatinous amorphous form, followed by slow drying to produce black or dark brown vitreous particles. The precipitated hydrated chromium oxide may contain some combined aliphatic acid groups and in some cases may be a hydrated basic chromic acetate, or the black form of chromic acetate may be used. The precipitated chromium compound may be diluted with inert materials to increase the volume of the catalyst obtained from a given weight of chromium; and diatomaceous earth is particularly suitable for this purpose, especially the white calcined grade. Addition of diatomaceous earth to the extent of 5% to 50% of the final weight of the catalyst has been found to improve the mechanical strength of the catalyst in most cases without seriously decreasing the catalytic activity. The dried gel obtained in the absence of inert diluent or extender is often brittle and may break into particles which are smaller than those most suitable for use as catalysts.

A suitable catalyst can be prepared by the reduction of chromic acid with ethanol in dilute solution and the subsequent drying of the gel-like precipitate. Or the catalyst may be made by adding ammonia slowly to a very dilute solution of chromium nitrate. A third method which is applicable involves acidifying an aqueous solution of chromium nitrate with acetic acid and then precipitating a gel by the addition of ammonia followed by drying to the dark vitreous form. Or the catalyst may be prepared by precipitating the oxide from a solution of black chromium acetate with ammonia and subsequently drying. Best results with this last catalyst are obtained when finely divided diatomaceous earth is suspended in the chromium acetate solutions before precipitation. In this way the oxide becomes intimately associated with the extender. Still another method which has been found to be particularly suitable consists in reducing ammonium dichromate with sodium sulfite. Here again the use of an extender such as diatomaceous earth is found to be desirable.

In any case it is advantageous to use the catalyst in the dark vitreous form. Among the possible extenders may be included silica, silica gel, pumice, diatomaceous earth, etc. The refined form of diatomaceous earth, known as "Superfloss," is generally the most desirable, although many other extenders are satisfactory. It is essential to avoid the presence of chlorides in the catalysts inasmuch as they tend to poison the latter.

The activity of the catalysts gradually decreases during use and this is believed to be due to an accumulation of a carbonaceous deposit on the catalyst. The presence of the carbon is particularly objectionable and must be removed periodically in order to assure a satisfactory performance of the catalytic agent. By burning off the deposit on the catalyst with air or any oxygen gas mixture at temperatures between 400° and 600° C., the activity of the catalyst may be restored. The catalyst may be thus reactivated many times without loss in activity of the catalyst. It is preferred to regulate the temperature of the catalyst to the minimum required to burn off the deposit in order to avoid a reduction in the activity of the catalyst due to overheating. After burning the carbonaceous layer off the catalyst, it is advisable to pass hydrogen over the catalyst before reuse in the catalysis reaction. This treatment, combined with a reduction of the pressure in order to remove absorbed water vapor, tends to improve the results.

With the catalysts disclosed, the preferred temperatures of operation are between 550° and 650° C. with space velocities of 200 to 800. Under these conditions, when isobutyronitrile is passed over the catalyst, as much as 35% of the saturated nitrile is decomposed. The products may be separated by fractional distillation and yields of methacrylonitrile, amounting to as much as 85% of the theoretical yield based on decomposed butyronitrile, may be obtained. In similar manner the corresponding unsaturated nitriles may be obtained from other saturated nitriles such as propionitrile, n-butyronitrile, isovalero nitrile, 2-ethyl-butyronitrile, etc.

We have also obtained good results when using a catalyst which was prepared by precipitating vanadic acid in gelatinous form, drying and crushing to suitable size and reducing the $V_2O_5$ to a lower oxide by passing hydrogen over the catalyst at 400°–500° C. This catalyst is not so active as the chromium oxide gel catalysts but conversions of 15% and final yields, based on the decomposed saturated nitrile, of 65% are obtainable. In contrast, under similar conditions, catalysts based on molybdenum and tungsten oxides give poor results.

Our invention may be illustrated by the following examples:

PREPARATION OF CATALYST

EXAMPLE 1

160 g. of chromic acid ($CrO_3$) was dissolved in two liters of water and eight portions each of 10 cc. of ethyl alcohol were added at five minute intervals. The solution was allowed to stand four hours and the addition of alcohol was repeated. The solution was heated to boiling, 36 g. of finely powdered, acid-washed diatomaceous earth was added, and refluxing was continued for 15 hours. The solution was filtered and the jelly obtained was dried at 70° C. to a hard black cake, which was broken up to 4 to 10 mesh size and then further dried by heating slowly up to 600° C. in a stream of hydrogen before use.

EXAMPLE 2

331 g. of crystalline chromic nitrate $$(Cr(NO_3)_3.9H_2O)$$

was dissolved in 2050 cc. of water and 109 g. of ammonium acetate was added. The solution was heated to boiling for a short time, cooled to room temperature and a solution of 298 cc. of concentrated $NH_4OH$ in 828 cc. of water was added slowly while the mixture was stirred. On standing overnight, a firm blue jelly was formed. This was thoroughly washed with water, filtered, and the filter cake dried at 70° C. The catalyst was heated slowly to 600° C. in a stream of hydrogen before use.

EXAMPLE 3

Catalyst was prepared in the same way as Example 2 from 575 g. of chromic nitrate, except that 33 g. of Superfloss was suspended in the solution before precipitation with ammonia. This gave a harder catalyst with less tendency to crumble.

EXAMPLE 4

Black chromium acetate was dissolved in water and Superfloss was suspended in the solution before adding ammonium hydroxide at room temperature. After standing 12 hours, a stiff jelly was formed which was thoroughly washed, dried at 70° C., and heated slowly to 600° C. before use.

EXAMPLE 5

Ammonium metavanadate was dissolved in water and an excess of nitric acid was added to precipitate vanadic acid. The precipitate was filtered and washed with hot dilute nitric acid to remove ammonium salts. The precipitate was heated with water until a jelly was formed, which was dried at 100° C., broken into 4 to 8 mesh particles and ignited at 400° C. to drive off the water. This gave strong particles of a vanadium pentoxide gel. The vanadium pentoxide gel was reduced with hydrogen at 400–500° C. to $V_2O_3$ before use as a dehydrogenation catalyst.

EXAMPLE 6

596 g. of $Na_2Cr_2O_7.2H_2O$ was dissolved in five liters of water and 72 g. of Superfloss was suspended in the solution. 755 g. of sodium sulfite was added during a period of five hours while the solution was being stirred vigorously. The precipitate was filtered and washed thoroughly with water, dried at 70° C., and broken into 4 to 10 mesh particles which were further heated to 600° C. before use.

PREPARATION OF UNSATURATED NITRILES

The results obtained with the above catalysts in the dehydrogenation of saturated nitriles to unsaturated nitriles are given in the data below. The yield of unsaturated nitrile is expressed as the percentage of the yield which was theoretically obtainable from the amount of saturated nitrile which was decomposed.

EXAMPLE 7

*Preparation of methacrylonitrile from isobutyronitrile*

| Catalyst example | Temp. | Space velocity | Yield |
|---|---|---|---|
| | ° C. | | Per cent |
| 1 | 615 | 236 | 82 |
| 2 | 625 | 511 | 74 |
| 3 | 615 | 410 | 79 |
| 4 | 615 | 197 | 71 |
| 5 | 615 | 186 | 72 |
| 6 | 638 | 413 | 79 |
| 1 | 600 | 467 | 80 |
| 5 | 650 | 184 | 68 |

EXAMPLE 8

*Preparation of acrylonitrile from propionitrile*

| Catalyst example | Temp. | Space velocity | Yield |
|---|---|---|---|
| | ° C. | | Per cent |
| 1 | 625 | 404 | 72 |
| 3 | 630 | 399 | 68 |

EXAMPLE 9

A sample of n-butyronitrile was dehydrogenated over the catalyst of Example 1 at a temperature of 615° C. and at a space velocity of about 400. The products included acrylonitrile, crotononitrile, and allyl cyanide.

EXAMPLE 10

2-ethyl-butyronitrile was passed over the catalyst of Example 1 at a temperature of 580° C. and a space velocity of 440. Allyl cyanide, crotononitrile, and 2-ethyl-crotononitrile were identified in the product. Titration of the unsaturated nitriles with bromine indicated a conversion of 40% of the original 2-ethyl-butyronitrile to unsaturated nitriles.

EXAMPLE 11

Isobutyronitrile was passed over quartz coated with shiny carbon at 700° C. and at a space velocity of 402. This reaction gave a 30% yield of methacrylonitrile, a 24% yield of acrylonitrile, and a 26% yield of hydrogen cyanide based on the amount of isobutyronitrile which was decomposed.

EXAMPLE 12

When Example 11 was repeated at a temperature of 750° C. and at a space velocity of 380, the yields included 24% hydrogen cyanide, 20% acrylonitrile, 11% methacrylonitrile based on the amount of isobutyronitrile which was decomposed. Some methane and hydrogen were also formed.

EXAMPLE 13

When propionitrile was substituted for the isobutyronitrile of Example 12, there was obtained an 18% conversion to acrylonitrile and 18% to hydrogen cyanide.

Examples 1 through 4 and 6 show various methods of preparing chromium oxide catalysts in which the chromium compound is first precipitated in gelatinous amorphous form and then heated to form a vitreous hard catalyst. Example 5 shows the preparation of an active vanadium catalyst. Examples 7 through 10 illustrate the use of catalysts in the dehydrogenation of saturated nitriles over suitable catalysts. Examples 11, 12, and 13 indicate the effect of high temperatures in causing a splitting of hydrogen cyanide.

We claim:

1. A process for the production of an aliphatic nitrile having an $\alpha$-$\beta$ olefinic linkage which comprises passing the corresponding saturated nitrile, at a space velocity of about 100 to about 1000, through a reaction zone which is maintained at a temperature of about 550° C. to about 650° C. and which contains a catalyst comprising the dark vitreous oxide of a metal from the group consisting of chromium and vanadium.

2. A process for the production of aliphatic nitriles having an $\alpha$-$\beta$ olefinic linkage which comprises heating, to a temperature within the range of about 550° C. to about 650° C., the corresponding saturated nitriles in the presence of a catalyst containing a dark vitreous oxide of a metal from the group consisting of chromium and vanadium.

3. A process for the production of an aliphatic nitrile having an $\alpha$-$\beta$ olefinic linkage which comprises passing the corresponding saturated nitrile, at a space velocity of about 100 to about 1000, through a reaction zone which is maintained at a temperature of about 550° C. to about 650° C. and which contains a catalyst comprising an inert extender and a dark vitreous oxide of a metal from the group consisting of chromium and vanadium.

4. A process for the production of aliphatic nitriles having an $\alpha$-$\beta$ olefinic linkage which comprises heating, to a temperature within the range of about 550° C. to about 650° C., the corresponding saturated nitriles in the presence of a catalyst containing an inert extender and a dark vitreous oxide of a metal from the group consisting of chromium and vanadium.

5. The process of claim 3 in which the inert extender is diatomaceous earth.

6. The process of claim 3 in which the saturated nitrile is isobutyronitrile and the unsaturated nitrile is methacrylonitrile.

7. The process of claim 3 in which the saturated nitrile is propionitrile and the unsaturated nitrile is acrylonitrile.

8. In the process of dehydrogentaing saturated aliphatic nitriles to the corresponding nitriles having an $\alpha$-$\beta$ olefinic linkage, the improvement which comprises passing, at a space velocity of about 100 to about 1000, the corresponding saturated nitrile through a reaction zone maintained at a temperature of about 550° C. to about 650° C. and containing the dark vitreous oxide of a metal from the group consisting of chromium and vanadium.

LE ROY U. SPENCE.
FRITZ O. HAAS.